2 Sheets—Sheet 1.

S. D. KING,

Assignor, by mesne assignments, to J. B. SMITH and A. L. KING.

CAR TRUCK.

No. 10,194. Reissued Sept. 12, 1882.

Attest.

Walter Brailson

David H. Mead

Inventor:

Sidney D. King by

Elliot Spear

Atty.

THE MORRIS PETERS CO., PHOTO-LITHO., WASHINGTON, D. C.

2 Sheets—Sheet 2.

S. D. KING,

Assignor, by mesne assignments, to J. B. SMITH and A. L. KING.

CAR TRUCK.

No. 10,194. Reissued Sept. 12, 1882.

Attest:
Walter Dwaldron
David H. Mead

Inventor:
Sidney D. King
by Ellis Spear
Atty.

THE NORRIS PETERS CO., PHOTO-LITHO., WASHINGTON, D. C.

UNITED STATES PATENT OFFICE.

SIDNEY D. KING, OF PITTSTON, ASSIGNOR, BY MESNE ASSIGNMENTS, TO JOHN B. SMITH, OF DUNMORE, AND ANTOINETTE L. KING, OF WEST PITTSTON, PENNSYLVANIA.

CAR-TRUCK.

SPECIFICATION forming part of Reissued Letters Patent No. 10,194, dated September 12, 1882.

Original No. 227,792, dated May 18, 1880. Application for reissue filed July 24, 1882.

*To all whom it may concern:*

Be it known that I, SIDNEY D. KING, of Pittston, in the county of Luzerne and State of Pennsylvania, have invented certain new and useful Improvements in Car-Trucks; and I do hereby declare the following to be a full, clear, and exact description of the invention, such as will enable others skilled in the art to which it appertains to make and use the same.

The invention relates to car-trucks of the form shown in Letters Patent granted me on the 11th day of November, 1879. In this patent the truck was shown as held rigidly against swiveling, and also had means for permitting limited rocking motion to the body. In my present invention I use the non-swiveling car-truck, with body rocking. I have devised, however, different modes of connection between the body and truck and a spring for limiting the motion and for returning the car to an upright position.

Figure 1:
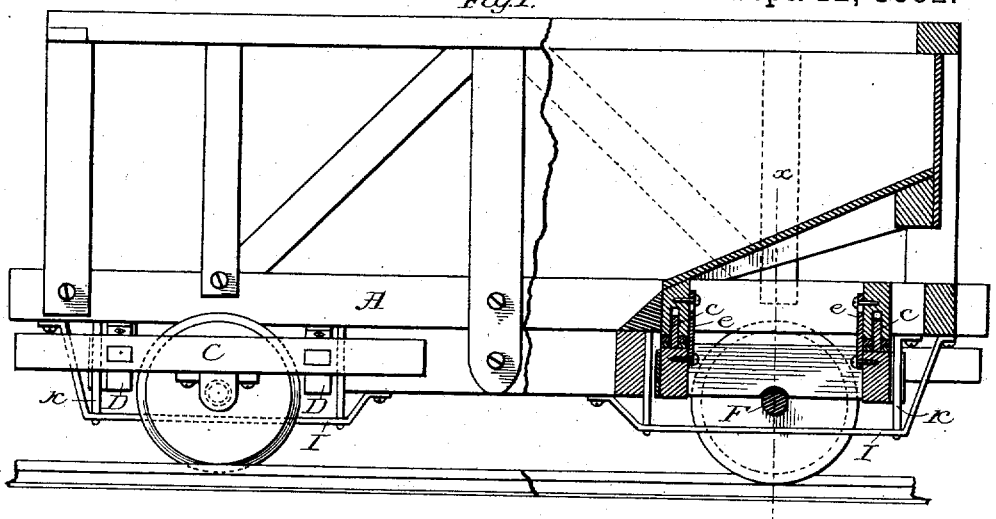
Figure 2:
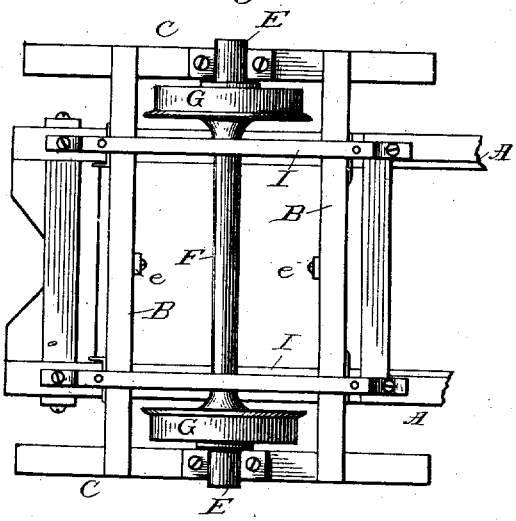
Figure 3:
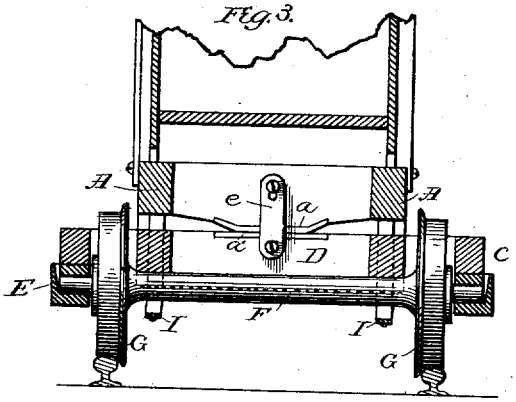
Figure 4:
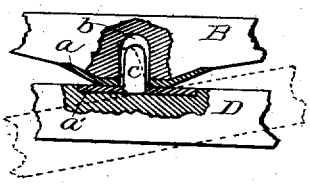
Figure 6:
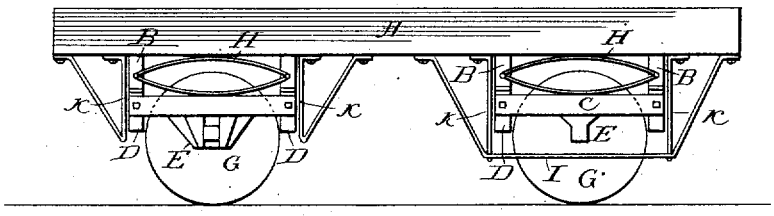
Figure 5:
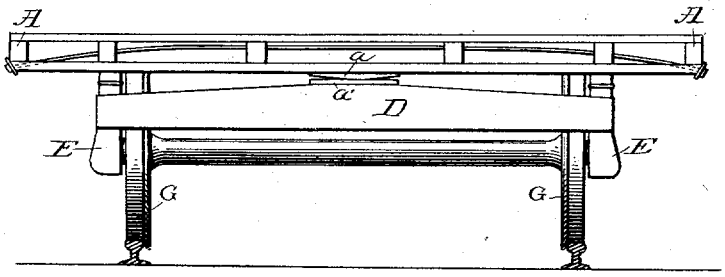

In the drawings, Figure 1 is a side view of a narrow car, partly in section, showing the method of arranging the trucks beneath the car. Fig. 2 is a bottom plan of one of the trucks, also showing a portion of the car-frame. Fig. 3 is a transverse section of the car and truck on the line *x x* of Fig. 1. Fig. 4 is an enlarged detail of one of the points of support, illustrating by dotted lines the position a truck may assume without disturbing the equilibrium of the car. Fig. 5 is a vertical transverse section of a broad car supported by my improved truck. Fig. 6 is a side view of the same, showing the position and arrangement of the springs by which the car is partially sustained upon the truck and the brackets for holding the truck and preventing swiveling.

A represents the outer side pieces of a car-frame, connected by suitable girts and the bolsters B, each of these bolsters being provided upon its under side with a rocking-plate, *a*, through which and extending into the bolster is formed the mortise *b* for the reception of pins *c*, that project upward from the plates *a'* upon the truck-beams D. These truck-beams are connected at their outer ends by the longitudinal pieces C, to which are secured axle-boxes E, in which revolve the journals of the axles F, carrying the car-wheels G.

It will be observed that each truck is provided with but a single axle. It therefore becomes necessary to provide means for retaining it in its proper position beneath the car, and at the same time preserve the flexibility of the connection, so that the wheels may accommodate themselves to any unevenness of the track without imparting such movement to the car-body. This is effectually accomplished by supporting the bolsters of the car-body principally upon a central line, or, in other words, at the points where the pins *c* enter the bolsters, the mortises through the rocking-plate *a* and in the bolster, being of sufficient depth to allow a free rocking movement of the bolster upon the pin and bearing-plate *a'*, as clearly shown in Fig. 4, while the bearing of the car-frame upon the truck-beams at two points on opposite sides of the car-axle preserves the horizontality of the truck in a longitudinal direction.

To further increase the security of the connection between these parts, the strap *e* may be attached at one end to the truck-beams by a pivotal connection, their opposite ends being slotted and secured to the bolsters by a bolt passing through the slots, so as to give a free movement to the parts within certain limits.

Still further security may be gained, if desired, by applying the strap-braces I to the body-frame and allowing them to pass below the axle without touching, while their ends are firmly attached to the frame.

The swiveling of the truck under the body is prevented by means of guards K, which embrace the truck-frame on both sides, near the ends, and are fixed to the body-frame. These do not prevent the car-body from rocking laterally upon the truck, but hold the truck from swiveling under the body. As the guards K are fixed to the body-frame, the strap-braces I may be fixed to such guards.

When this improved construction is applied to narrow cars the flattening of the rocking plate for a short distance each way from the mortise *b* will give the car all the stability needed; but when wide cars are used I add springs H, which can be placed upon the side pieces, C, of the truck-frame and arranged to partially support the car-body, thus preventing any undue oscillation of the latter and returning the car to its normal position.

Experience has demonstrated that a car can be built to carry a given load with my two-wheel trucks with twenty-five to thirty-three per cent. less weight of car than with the four-wheel truck, thus making a very great saving in the hauling of dead weight in trains, and also making a great saving in the cost of the trucks, and also allowing the wheels to be placed about twice as far apart as can be done with safety in the ordinary manner of building four-wheeled cars, and at the same time giving to the car all the flexibility of a car with four-wheeled trucks and saving the wear on the wheels and track caused by the oscillating motion of the four-wheeled trucks.

Having thus described my invention, I claim—

1. The combination of a two-wheeled non-swiveling car-truck, provided with two central points of support in front and rear of the axle, with a car-body and springs for preventing undue oscillation of the body upon the truck, as set forth.

2. The combination of a two-wheeled non-swiveling car-truck, provided with two central elongated supports, *a*, in front and rear of its axle, and side springs, H, substantially as described.

3. A car-truck having one pair of wheels, a body resting thereon by central rocking connections, and guards fixed to the body and extending down by the side of the transverse beams of the truck, the parts being combined and operating to prevent swiveling, as set forth.

SIDNEY D. KING.

Witnesses:
G. S. FERRIS,
G. B. THOMPSON